(12) United States Patent
Been et al.

(10) Patent No.: US 11,544,955 B2
(45) Date of Patent: Jan. 3, 2023

(54) ULTRASONIC FINGERPRINT SENSOR AND ULTRASONIC FINGERPRINT SENSING METHOD USING THE SAME

(71) Applicant: Samsung Display Co., Ltd., Yongin-si (KR)

(72) Inventors: Kyoung Hun Been, Ulsan (KR); Jin Woo Kim, Hwaseong-si (KR); Byeong Kyu Jeon, Busan (KR); Soon Gyu Lee, Daegu (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/367,165

(22) Filed: Jul. 2, 2021

(65) Prior Publication Data

US 2022/0012448 A1    Jan. 13, 2022

(30) Foreign Application Priority Data

Jul. 9, 2020 (KR) .......................... 10-2020-0084598

(51) Int. Cl.
*G06V 40/13* (2022.01)
*G06V 40/12* (2022.01)
*G06V 40/10* (2022.01)
*G01S 15/89* (2006.01)

(52) U.S. Cl.
CPC ...... *G06V 40/1306* (2022.01); *G01S 15/8956* (2013.01); *G01S 15/8965* (2013.01); *G06V 40/10* (2022.01); *G06V 40/1376* (2022.01); *G06V 40/15* (2022.01)

(58) Field of Classification Search
CPC .............. G06V 40/1306; G06V 40/10; G06V 40/1376; G06V 40/15; G01S 15/8956; G01S 15/8965
See application file for complete search history.

(56) References Cited

U.S. PATENT DOCUMENTS

| | | |
|---|---|---|
| 10,438,040 B2 | 10/2019 | Strohmann et al. |
| 2016/0350573 A1 | 12/2016 | Kitchens, II et al. |
| 2017/0090028 A1 | 3/2017 | Djordjev et al. |
| 2018/0101711 A1 | 4/2018 | D'Souza et al. |
| 2018/0276440 A1 | 9/2018 | Strohmann et al. |
| 2018/0293370 A1 * | 10/2018 | Kim .................... G06F 21/45 |
| 2018/0357457 A1 | 12/2018 | Rasmussen et al. |
| 2018/0373913 A1 | 12/2018 | Panchawagh et al. |
| 2019/0370518 A1 * | 12/2019 | Maor .................... A61B 8/02 |
| 2021/0350099 A1 * | 11/2021 | Buchan ................ G06F 21/32 |

FOREIGN PATENT DOCUMENTS

| | | |
|---|---|---|
| KR | 10-2016-0130234 A | 11/2016 |
| KR | 10-2018-0063596 A | 6/2018 |
| KR | 10-2019-0075755 A | 7/2019 |

* cited by examiner

*Primary Examiner* — Premal R Patel
(74) *Attorney, Agent, or Firm* — Lewis Roca Rothgerber Christie LLP

(57) ABSTRACT

An ultrasonic fingerprint sensing method includes: generating a first ultrasonic wave using a first frequency; receiving a first signal generated by reflection of the first ultrasonic wave from each of a ridge and a valley of a fingerprint; generating a first image based on the first signal; comparing the first image with a registered reference image to generate a matching score; and in response to the matching score being less than a threshold value, generating a second image using a second frequency.

23 Claims, 19 Drawing Sheets

FIG. 9
(a)
(b)
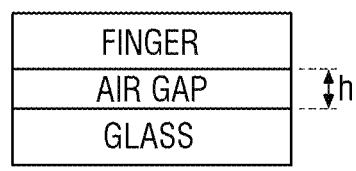

FIG. 11
| | Normal Finger | Dry Finger |
|---|---|---|
| 10MHz | 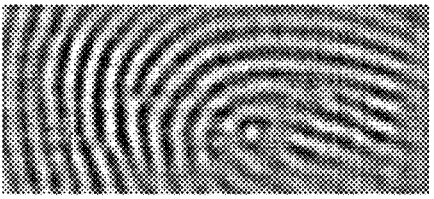 | 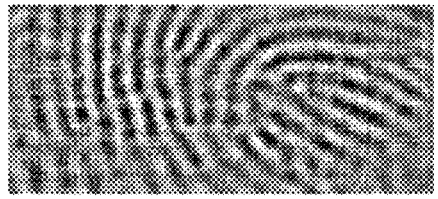 |

ULTRASONIC FINGERPRINT SENSOR AND ULTRASONIC FINGERPRINT SENSING METHOD USING THE SAME

CROSS-REFERENCE TO RELATED APPLICATION

The present application claims priority to and the benefit of Korean Patent Application No. 10-2020-0084598 filed on Jul. 9, 2020 in the Korean Intellectual Property Office, the entire content of which is incorporated herein by reference.

BACKGROUND

1. Field

Aspects of some example embodiments of the present disclosure relates to an ultrasonic fingerprint sensor, and an ultrasonic fingerprint sensing method using the same.

2. Description of the Related Art

A display device may be utilized with or incorporated in various electronic devices such as a smartphone, a tablet, a notebook computer, a monitor, and a television (TV). With the recent advance of mobile communication technology, the use of portable electronic devices such as smartphones, tablets, and notebook computers has increased enormously. The portable electronic devices contain personal information such as contacts, call history, messages, photos, notes, user's web surfing information, location information, financial information. In order to protect the personal information of the portable electronic devices, fingerprint authentication in which a fingerprint as user's biometric information is identified may be utilized for authentication. In this case, the display device may include a fingerprint sensor for fingerprint authentication.

The fingerprint sensor may be implemented as an optical sensor, an ultrasonic sensor, a capacitive sensor, or the like.

In the case of an ultrasonic fingerprint sensor, a fingerprint image may be generated, but the fingerprint image may vary according to the environment (e.g., temperature and humidity) to which the fingerprint is exposed.

The above information disclosed in this Background section is only for enhancement of understanding of the background and therefore the information discussed in this Background section does not necessarily constitute prior art.

SUMMARY

Aspects of some example embodiments of the present disclosure may include an ultrasonic fingerprint sensing method that is capable of improving recognition accuracy in various environments.

Aspects of some example embodiments of the present disclosure may also include an ultrasonic fingerprint sensor with relatively improved recognition accuracy in various environments.

However, aspects of embodiments according to the present disclosure are not restricted to those set forth herein. The above and other aspects of the present disclosure will become more apparent to one of ordinary skill in the art to which the present disclosure pertains by referencing the detailed description of the present disclosure given below.

According to some example embodiments, an ultrasonic fingerprint sensing method comprises: generating a first ultrasonic wave using a first frequency; receiving a first signal generated by reflection of the first ultrasonic wave from each of a ridge and a valley of a fingerprint; generating a first image based on the first signal; performing comparison/determination on the first image and a registered reference image; and generating a second image using a second frequency if it is determined that a matching score as a result of comparison between the first image and the registered reference image is less than a threshold value.

According to some example embodiments, an ultrasonic fingerprint sensing method comprises generating a first ultrasonic wave using a first frequency; receiving a first signal generated by reflection of the first ultrasonic wave from each of a ridge and a valley of a fingerprint; generating a first image based on the first signal; performing comparison/determination on the first image and a registered reference image; and performing measurement/determination on a temperature of the fingerprint if it is determined that a matching score as a result of comparison between the first image and the registered reference image is less than a threshold value.

According to some example embodiments, an ultrasonic fingerprint sensor comprises an ultrasonic wave generation unit configured to generate a first ultrasonic wave using a first frequency; a reception unit configured to receive a first signal generated by reflection of the first ultrasonic wave from each of a ridge and a valley of a fingerprint; an image generation unit configured to generate a first image based on the first signal; and a comparison/determination unit configured to perform comparison/determination on the first image and a registered reference image; and wherein the image generation unit further generates a second image using a second frequency if it is determined by the comparison/determination unit that a matching score as a result of comparison between the first image and the registered reference image is less than a threshold value.

According to some example embodiments of the present disclosure, it may be possible to provide an ultrasonic fingerprint sensing method and an ultrasonic fingerprint sensor, capable of improving recognition accuracy in various environments.

The characteristics of embodiments according to the present disclosure are not limited to the aforementioned characteristics, and various other characteristics are included in embodiments according to the present disclosure.

BRIEF DESCRIPTION OF THE DRAWINGS

The above and other aspects and characteristics of embodiments according to the present disclosure will become more apparent by describing in more detail aspects of some example embodiments thereof with reference to the attached drawings, in which:

FIG. 9 is a diagram illustrating models for measuring ultrasonic wave reflection characteristics in a first environment and a second environment according to some example embodiments;

FIG. 11 shows photos of fingerprint images taken in first and second environments, by using a second ultrasonic wave according to some example embodiments;

DETAILED DESCRIPTION

Figure 1:
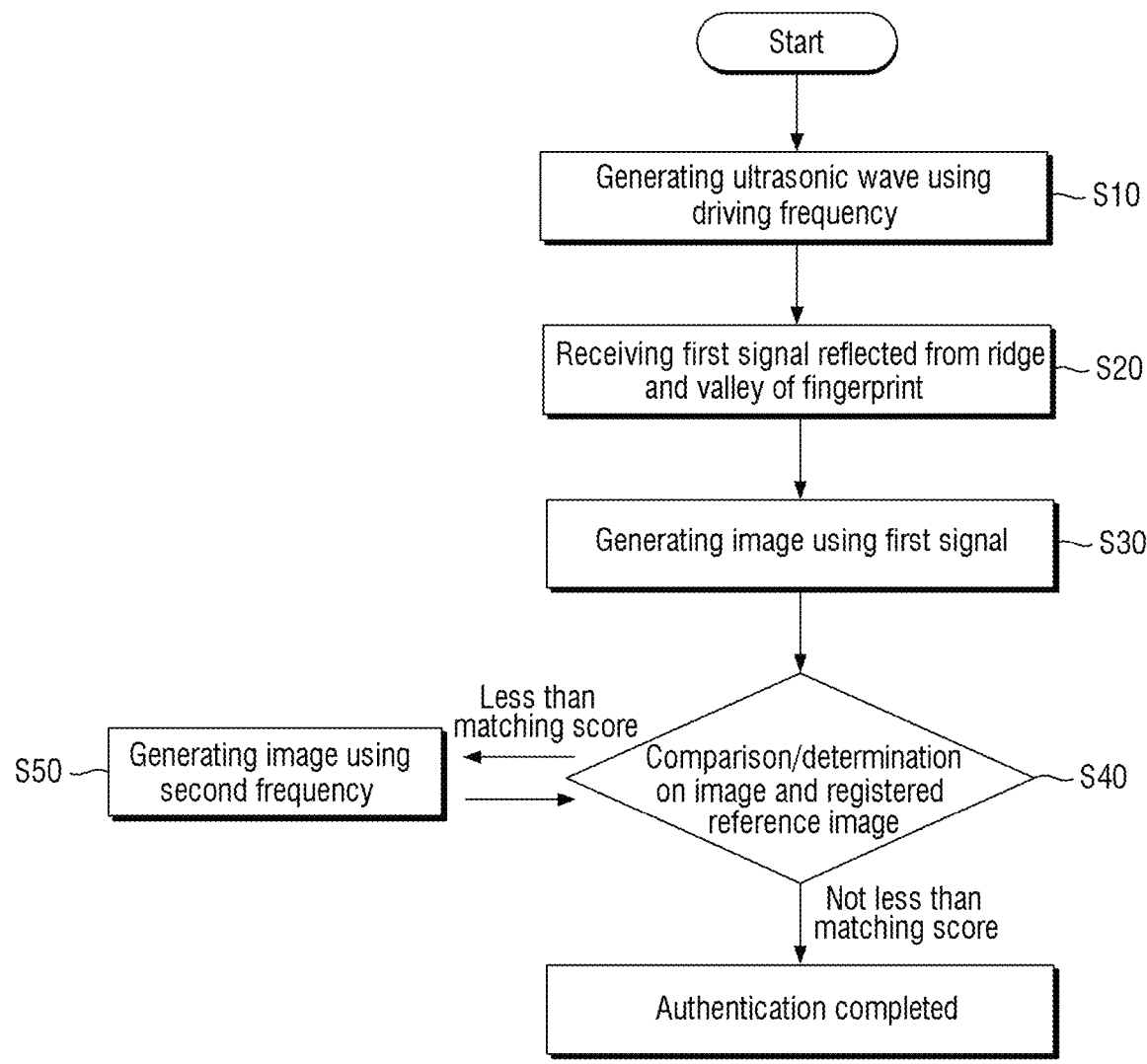
FIG. 1 is a flowchart illustrating an ultrasonic fingerprint sensing method according to some example embodiments.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims and their equivalents.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The example term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The example terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Aspects of some example embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, for example, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, aspects of some example embodiments of the invention will be described in more detail with reference to the attached drawings.

Figure 2:
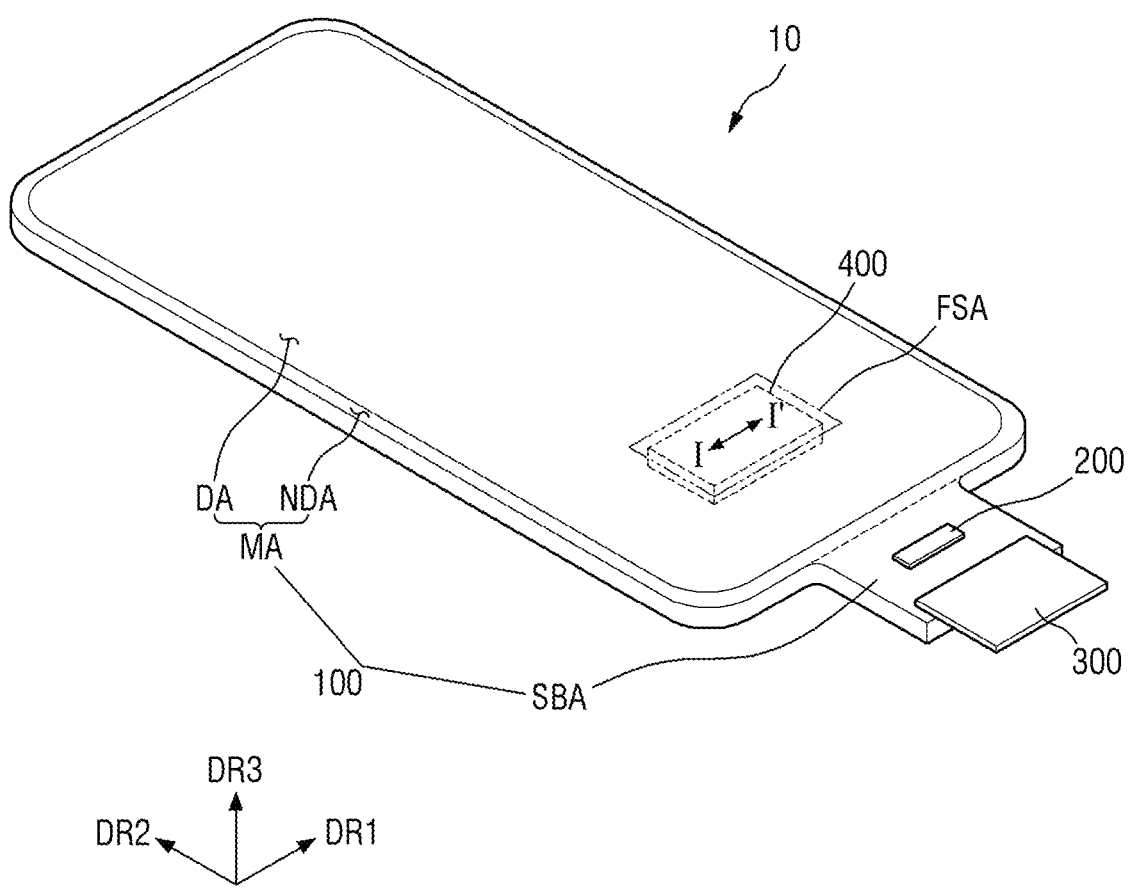
FIG. 2 is a perspective view illustrating a display device equipped with an ultrasonic fingerprint sensor for ultrasonic fingerprint sensing according to some example embodiments.
Figure 3:
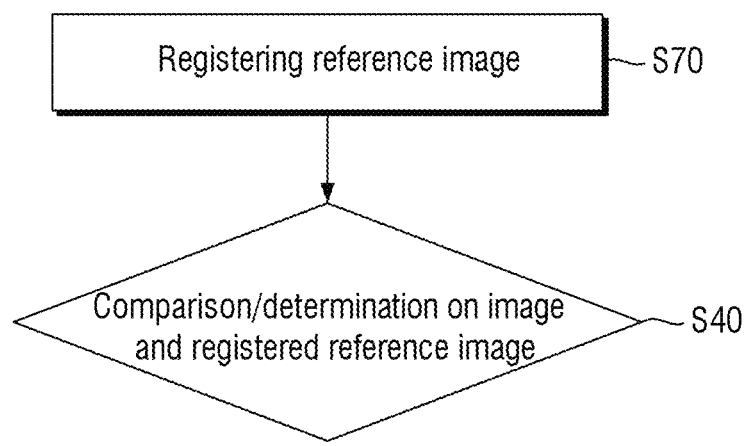
FIG. 3 is a flowchart illustrating operations of registering a reference image, and comparing an image with the registered reference image to make a determination in an ultrasonic fingerprint sensing method according to some example embodiments.
Figure 4:
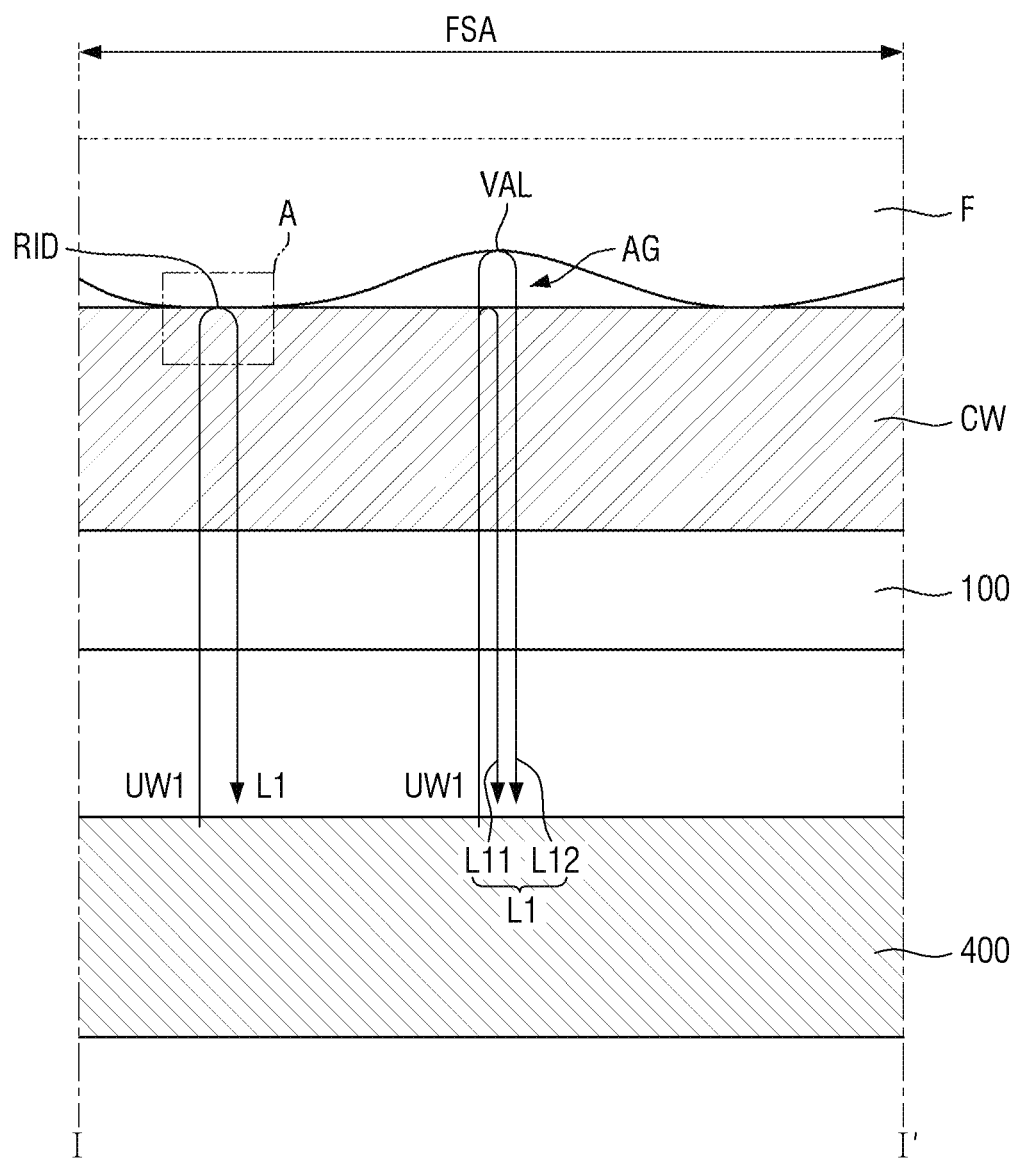
FIG. 4 is a schematic view additionally showing propagation paths of a first ultrasonic wave and a first signal in a cross-sectional view taken along the line I-I' of FIG. 2.
Figure 5:
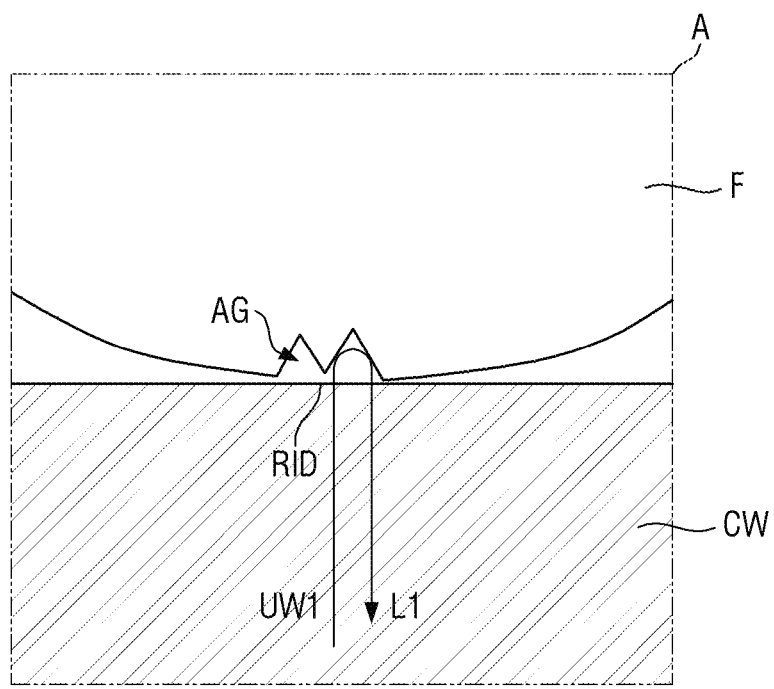
FIG. 5 is an enlarged view of the area A of FIG. 4.
Figure 7:
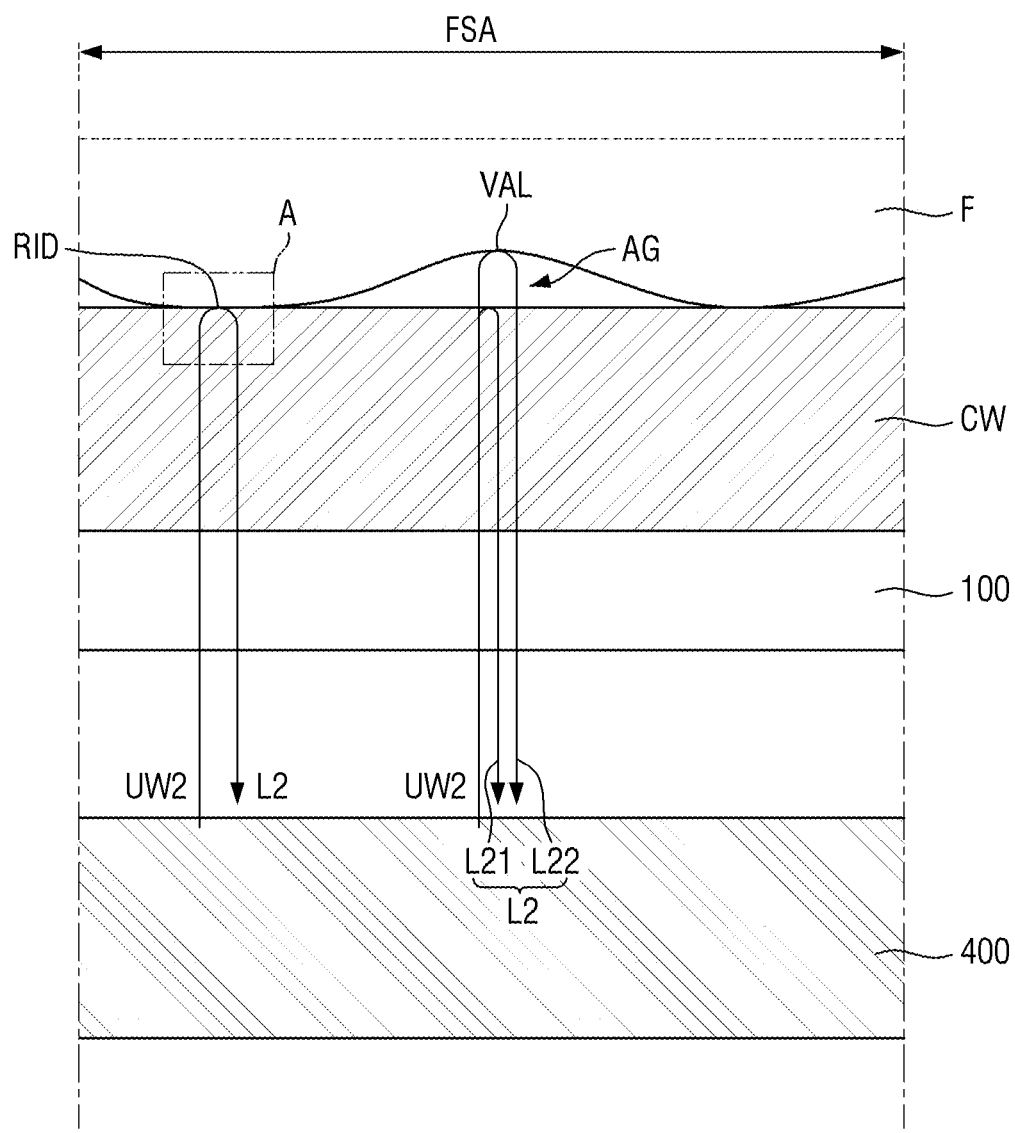
FIG. 7 is a schematic view illustrating propagation paths of a second ultrasonic wave and a second signal according to some example embodiments.
Figure 8:
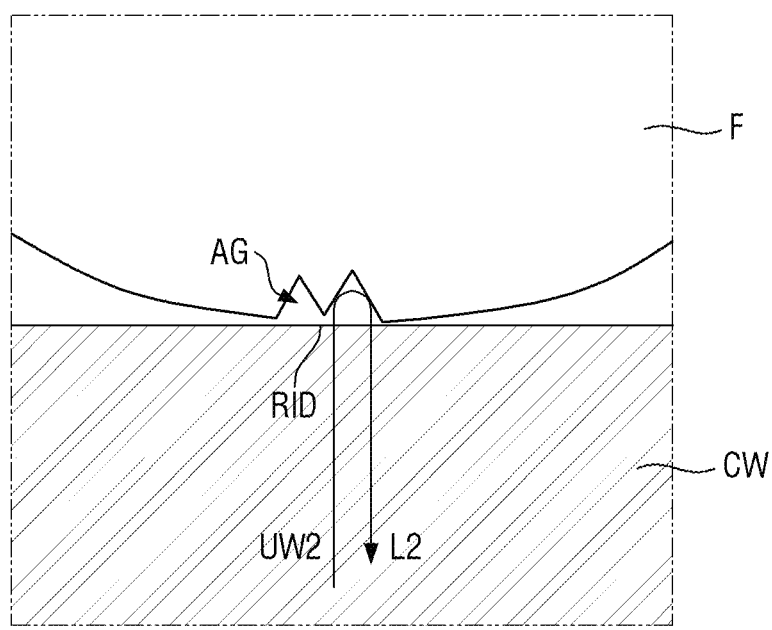
FIG. 8 is an enlarged view of the area A of FIG. 7.

FIG. 1 is a flowchart illustrating an ultrasonic fingerprint sensing method according to some example embodiments. Although FIG. 1 illustrates various operations according to some example embodiments, the number of operations and the order of operations may vary according to some example embodiments. For example, according to some example embodiments, there may be additional operations or fewer operations, or the order of the operations may vary, without departing from the spirit and scope of embodiments according to the present disclosure. FIG. 2 is a perspective view illustrating a display device equipped with an ultrasonic fingerprint sensor for ultrasonic fingerprint sensing according to some example embodiments. FIG. 3 is a flowchart illustrating operations of registering a reference image, comparing an image with the registered reference image, and making a determination in an ultrasonic fingerprint sensing method according to some example embodiments. Although FIG. 3 illustrates various operations according to some example embodiments, the number of operations and the order of operations may vary according to some example embodiments. For example, according to some example embodiments, there may be additional operations or fewer operations, or the order of the operations may vary, without departing from the spirit and scope of embodiments according to the present disclosure. FIG. 4 is a schematic view additionally showing propagation paths of a first ultrasonic wave and a first signal in a cross-sectional view taken along line I-I' of FIG. 2. FIG. 5 is an enlarged view of area A of FIG. 4. FIG. 7 is a schematic view illustrating propagation paths of a second ultrasonic wave and a second signal. FIG. 8 is an enlarged view of area A of FIG. 7.

Referring to FIGS. 1 to 7, an ultrasonic fingerprint sensing method according to some example embodiments is implemented with an ultrasonic fingerprint sensor 400. The ultrasonic fingerprint sensor 400 serves to recognize a fingerprint as biometric information for protecting personal information of a display device 10, and authenticate whether or not the recognized fingerprint matches (e.g., is identical with) a previously captured user's fingerprint. The ultrasonic fingerprint sensor 400 may recognize the fingerprint using an ultrasonic wave that may have a driving frequency suitable for penetration of multiple layers.

First, a description is made of the configuration of the display device 10 equipped with the ultrasonic fingerprint sensor 400.

The display device 10 may be a light emitting display device such as an organic light emitting display device using an organic light emitting diode, a quantum dot light emitting display device including a quantum dot light emitting layer, an inorganic light emitting display device including an inorganic semiconductor, and a micro light emitting display device using a micro light emitting diode (LED).

The display device 10 includes a display panel 100, a display driving circuit 200, a display circuit board 300, and the ultrasonic fingerprint sensor 400. The display device 10 may further include a cover window CW (see FIG. 4) arranged on top of the display panel 100. Although the cover window is not shown in FIG. 2, a stacked structure of the display device 10 on which the cover window is located will be described with reference to FIG. 4.

The display panel 100 may, in a plan view (e.g., a view normal or perpendicular with respect to a plan of the display surface of the display panel 100), be formed in a rectangular shape having short sides in a first direction DR1 and long sides in a second direction DR2 crossing the first direction DR1. The corners formed by meeting of the short sides in the first direction DR1 and the long sides in the second direction DR2 may be rounded to have a curvature (e.g., a set or predetermined curvature) or left rectangular. The planar shape of the display panel 100 is not limited to the rectangular shape, and may be formed in another polygonal shape, a circular shape or an elliptical shape. The display panel 100 may be formed to be flat, but embodiments according to the present disclosure are not limited thereto. For example, the display panel 100 may include a curved portion formed at left and right ends and having a curvature (e.g., a set or predetermined curvature) or a varying curvature. In addition, the display panel 100 may be formed flexibly such that it can be twisted, bent, folded, or rolled.

The display panel 100 may include a main region MA and a sub-region SBA.

The main region MA may include a display area DA displaying an image and a non-display area NDA that is a peripheral area of the display area DA. The display area DA may include display pixels for displaying an image. The non-display area NDA may be defined as an area from the boundary of the display area DA to the edge of the display panel 100.

The display area DA may include a fingerprint sensing area FSA. The fingerprint sensing area FSA may correspond to an area where the ultrasonic fingerprint sensor 400 is arranged. The fingerprint sensing area FSA may be a part of the display area DA as shown in FIG. 2, but embodiments according to the present disclosure are not limited thereto. According to some example embodiments, the fingerprint area FSA may be substantially identical with the display area DA, covering the whole area of the display area DA.

The sub-region SBA may protrude from one side of the main region MA in the second direction DR2. The sub-region SBA may be smaller in length than the main region MA in both the first and second directions DR1 and DR2, but embodiments according to the present disclosure are not limited thereto.

Although an example is shown in FIG. 2 in which the sub-region SBA is stretched, the sub-region SBA may be bent and, in this case, arranged on the bottom surface of the display panel 100. In the case where the sub-region SBA is bent, the sub-region SBA may overlap the main region MA in the thickness direction (e.g., third direction DR3) of the substrate SUB. The display driving circuit 200 may be arranged in the sub-region SBA.

The display driving circuit 200 may generate signals and voltages for driving the display panel 100. The display driving circuit 200 may be formed as an integrated circuit (IC) and attached onto the display panel 100 by a chip on glass (COG) method, a chip on plastic (COP) method, or an ultrasonic bonding method, but embodiments according to the present disclosure are not limited thereto. For example, the display driving circuit 200 may be adhered on the display circuit board 300 by a chip on film (COF) method.

The display circuit board 300 may be attached to one end of the sub-region SBA of the display panel 100 with a conductive adhesive member such as an anisotropic conductive film. As a consequence, the display circuit board 300 may be electrically connected to the display panel 100 and the display driving circuit 200. The display panel 100 and the display driving circuit 200 may receive digital video data, timing signals, and driving voltages via the display circuit board 300. The display circuit board 300 may be a flexible film, such as a flexible printed circuit board, a printed circuit board, or a chip on film.

The ultrasonic fingerprint sensor 400 may be arranged on the bottom surface of the display panel 100.

A description is made hereinafter of the ultrasonic fingerprint sensing method using the ultrasonic fingerprint sensor 400. The detailed configuration of the ultrasonic fingerprint sensor 400 will be described later with reference to FIG. 12.

Referring to FIGS. 1 and 4, the ultrasonic fingerprint sensor 400 generates a first ultrasonic wave UW1 with a first frequency (or driving frequency) (operation S10). FIG. 4 shows an example situation where the user placed a finger F on the cover window CW of the display device 10 for fingerprint authentication.

The first frequency may belong to a frequency band suitable for penetration through multiple layers of the display device 10 as described above. The display panel 100 and the cover window CW may be located on the ultrasonic fingerprint sensor 400 of the display device 10. The cover window CW may be located on the display panel 100 to cover the top surface of the display panel 100. The cover window CW may serve to protect the top surface of the display panel 100. The cover window CW may be attached to the top surface of the display panel 100 using a transparent adhesive member. For example, the transparent adhesive member may be a transparent adhesive film such as an optically clear adhesive (OCA) film or a transparent adhesive resin such as an optically clear resin (OCR).

The cover window CW may be made of a transparent material such as glass or plastic. For example, in the case where the cover window CW is made of glass, ultra-thin glass (UTG) having a thickness equal to or less than 0.1 mm may be used. In the case where the cover window CW is made of plastic, a transparent polyimide film may be used.

The ultrasonic fingerprint sensor 400 may be arranged on the bottom surface of the display panel 100. The ultrasonic fingerprint sensor 400 may be adhered onto the bottom surface of the display panel 100 with a transparent adhesive member.

In this case, the multiple layers may include the display panel 100, the transparent adhesive member, and the cover window CW. The first frequency may belong to a frequency band optimized for penetration through the display panel 100, the transparent adhesive member, and the cover window CW.

The finger F may include a fingerprint facing the cover window CW. The fingerprint of the finger F may include depressions and prominences. The depressions and prominences of the fingerprint may be repeatedly arranged as shown in FIG. 4. In at least one section including one depression and one prominence taken among the repeated depressions and prominences, the prominence may be referred to as ridge RID and the depression may be referred to as valley VAL. The ridge RID of the fingerprint may be closer to the cover window CW than the valley VAL.

The first ultrasonic wave UW1 is irradiated to the ridge RID and the valley VAL of the fingerprint and then reflected by the ridge RID and the valley VAL. The first ultrasonic wave UW1 irradiated to the ridge RID may penetrate the display panel 100, the transparent adhesive member, and the cover window CW to reach the ridge RID. As shown in FIG. 4, because the ridge RID directly contacts the cover window CW, there may be no gap, e.g., air gap AG, between the ridge RID and the cover window CW.

Meanwhile, the first ultrasonic wave UW1 irradiated to the valley VAL may penetrate the display panel 100, the transparent adhesive member, the cover window CW, and the air gap AG to reach the valley VAL. Although the first ultrasonic wave UW1 irradiated to the ridge RID and the first ultrasonic wave UW1 irradiated to the valley VAL travel through the same penetration path of the display panel 100, the transparent adhesive member, and the cover window CW, the first ultrasonic wave UW1 irradiated to the valley VAL may further travel through the air gap AG. With regard to the first ultrasonic wave UW1 emitted by the ultrasonic fingerprint sensor 400, the first ultrasonic wave UW1 irradiated to the ridge RID and reflected by the ridge RID may be converted into a first signal L1. Further, the first ultrasonic wave UW1 irradiated to the valley VAL and reflected by an interface between the air gap AG and the cover window CW may be converted into a first reflection signal L11, and the first ultrasonic wave UW1 irradiated to the valley VAL and reflected by the valley VAL may be converted into a second reflection signal L12, the first and second reflection signals L11 and L12 constituting the first signal L1. The magnitude of the first reflection signal L11 may be greater than that of the second reflection signal L12.

The ultrasonic fingerprint sensor 400 may recognize the ridge RID and the valley VAL based on a first time difference between an emission time point of the first ultrasonic wave UW1 and an arrival time point of the first signal L1 reflected by the ridge RID and a second time difference between the emission time point of the first ultrasonic wave UW1 and arrival time points of the first signal L1 reflected by the valley VAL and the interface between the air gap AG and the cover window CW. However, given the existence of the air gap AG between the valley VAL and the cover window CW and the ultrasonic wave propagation speed varying with medium, it may not be easy to distinguish between the ridge RID and the valley VAL.

In order to factor in the air gap AG between the valley VAL and the cover window CW for more accurate distinction between the ridge RID and the valley VAL, it may be considered to calculate a ratio between the strength of the first ultrasonic wave UW1 and the strength of the first signal L1 as a method of distinguishing between the ridge RID and the valley VAL. The ratio of the strength of the first signal L1 to the strength of the first ultrasonic wave UW1 is defined as reflection coefficient R.

For example, the reflection coefficient R of the first ultrasonic wave UW1 irradiated to the valley VAL may be greater than the reflection coefficient R of the first ultrasonic wave UW1 irradiated to the ridge RID. In other words, whether it is the ridge RID or the valley VAL may be determined based on the reflection coefficient R of the first ultrasonic wave UW1.

Next, referring to FIGS. 1 and 4, the ultrasonic fingerprint sensor 400 receives the first signal L1 reflected by the ridge RID and the valley VAL of the fingerprint (operation S20).

Next, the ultrasonic fingerprint sensor 400 generates an image based on the first signal L1 (operation S30). At operation S30, the image may be a first image.

Next, the ultrasonic fingerprint sensor 400 compares the image (or first image) with the registered reference image to make a determination (operation S40).

Before comparing the image (or first image) with the registered reference image to make a determination at operation S40, it may be possible to register the reference image (or first reference image) (operation S70).

The reference image may be a user's fingerprint image registered in a room temperature/room humidity environment.

If it is determined at operation S40 that a matching score as a result of comparison between the image (or first image) and the registered reference image is equal to or greater than a threshold value, the fingerprint authentication of the user is completed.

Meanwhile, as shown in FIG. 5, the ridge RID of the fingerprint may have a surface profile varying with exposure environment. In more detail, in the case where the fingerprint is exposed to a low temperature/low humidity (dry) condition, wrinkles may be formed on the surface of the ridge RID of the fingerprint. The wrinkles on the surface of the ridge RID of the fingerprint may form an unintended air gap AG with the cover window CW.

That is, the wrinkles on the surface of the ridge RID, which vary with the fingerprint exposure environment, may make it difficult to distinguish between the ridge RID and valley VAL even though the reflection coefficient R of the first ultrasonic wave UW1 is used to distinguish between the ridge RID and valley VAL.

Figure 6:
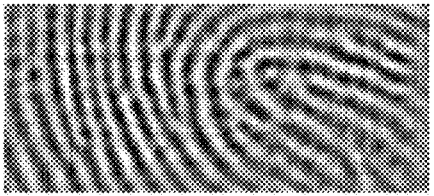
FIG. 6 shows photos of fingerprint images taken, in first and second environments, by using a first ultrasonic wave according to some example embodiments.

FIG. 6 shows photos of fingerprint images taken, in first and second environments, by using a first ultrasonic wave. In FIG. 6, a normal finger photo shows the finger F (see FIG. 4) in the first environment corresponding to a room temperature/room humidity environment, and a dry finger photo shows the finger F in the second environment corresponding to a low temperature/low humidity environment. In FIG. 6, a frequency optimized for penetration through the display panel 100, the transparent adhesive member, and the cover window CW is used as the first frequency. However, the first frequency is not limited thereto and may have a frequency equal to or higher than 1 MHz.

Referring to FIGS. 5 and 6, it is identified that the distinction between the ridge RID and the valley VAL is not easy in the second environment.

The ultrasonic fingerprint sensing method according to some example embodiments may be able to successfully perform fingerprint recognition regardless of the environment in such a way of attempting, when it is difficult to recognize the fingerprint because the fingerprint is exposed to the second environment, the fingerprint recognition by using the second ultrasonic wave of the second frequency belonging to a frequency band lower than the first frequency.

Referring back to FIGS. 1, 7, and 8, if it is difficult to distinguish between the ridge RID and the valley VAL by comparing the image (or first image) and the registered reference image and making a determination at operation S40 (or the matching score as a result of the comparison between the first image and the registered reference image is less than the threshold value), the ultrasonic fingerprint sensor 400 generates an image (or second image) by using a second ultrasonic wave UW2 with a second frequency (operation S50). The second frequency may be a frequency belonging to a frequency band lower than the first frequency. For example, the second frequency may have a value equal to or less than about 90% of the first frequency, although not limited thereto.

Generating, at operation S50, the image (or second image) by using the second ultrasonic wave UW2 with the second frequency, may include irradiating the second ultrasonic wave UW2 to the ridge RID and the valley VAL, receiving a second signal L2 reflected thereby, and generating the second image based on the received second signal L2. The second ultrasonic wave UW2 irradiated to the ridge RID and reflected by the ridge RID may be converted into the second signal L2, and the second ultrasonic wave UW2 irradiated to the valley VAL and reflected by the interface between the air gap AG and the cover window CW and by the valley VAL may be converted respectively into a first reflection signal L21 and a second reflection signal L22. The magnitude of the first reflection signal L21 may be greater than that of the second reflection signal L22.

Because the second frequency belongs to a frequency band lower than the first frequency, the reflection coefficient R of the second ultrasonic wave UW2 irradiated to the valley VAL may be less than the reflection coefficient R of the first ultrasonic wave UW1 irradiated to the valley VAL. A description thereof is made with reference to FIGS. 9 and 10.

Figure 10:
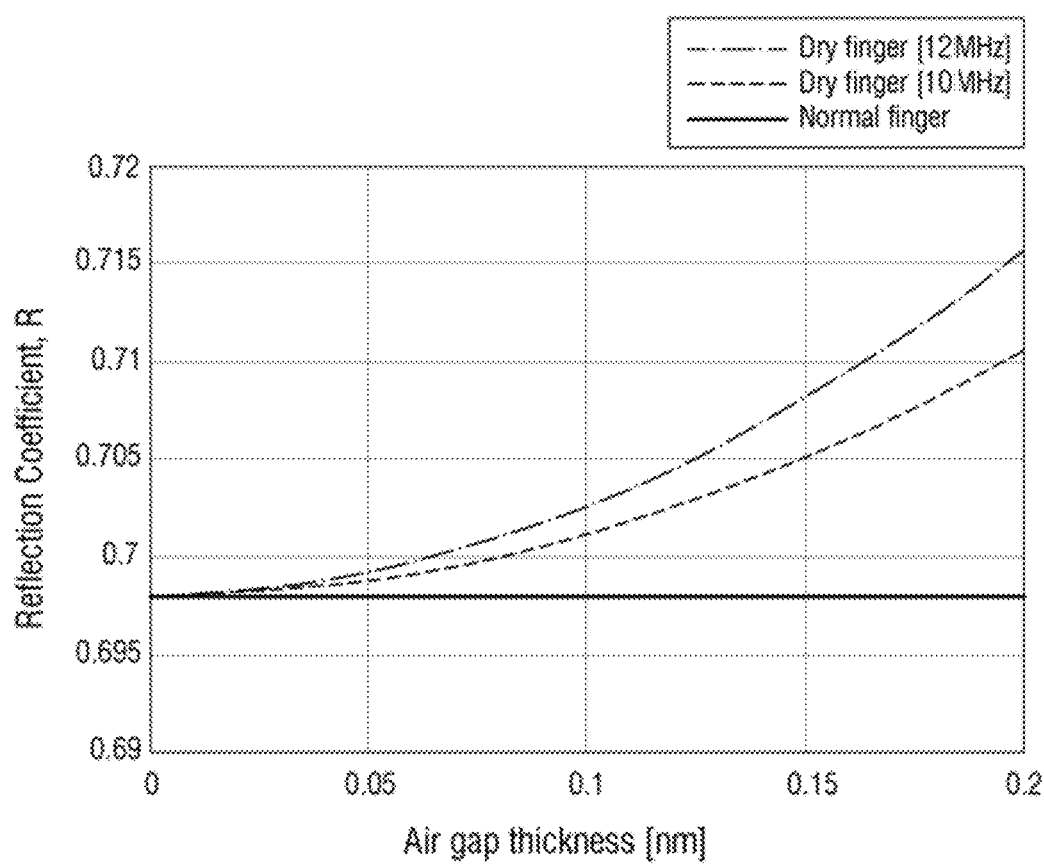
FIG. 10 is a graph illustrating reflection coefficients in respect to air gap thickness calculated in the models of FIG. 9 according to some example embodiments.

FIG. 9 is a diagram illustrating models for measuring ultrasonic wave reflection characteristics in a first environment and a second environment. FIG. 10 is a graph illustrating reflection coefficients in respect to air gap thickness calculated in the models of FIG. 9. In FIG. 9, (a) shows a first model in which an object (e.g., finger) is in direct contact with a glass, and (b) shows a second model in which an air gap having a certain gap h is formed between the glass and the finger. The first model is the case where the ridge of the fingerprint is exposed to the first environment and may correspond to a normal finger. The second model is the case where the ridge of the fingerprint is exposed to the second environment.

In FIG. 10, a horizontal axis (air gap thickness (nm)) corresponds to the gap h in the second model of FIG. 9, and a vertical axis (reflection coefficient R) corresponds to a simulation value varying with the gap h of the second model. The second model may correspond to a dry finger. In the second model, the reflection coefficient is measured at each of the frequencies. For example, the reflection coefficient R is measured by using the first ultrasonic wave UW1 of the first frequency, and the reflection coefficient R is measured by using the second ultrasonic wave UW2 of the second frequency.

Referring to FIGS. 9 and 10, the reflection coefficient R measured in the first model is about 0.698, and the reflection coefficient R measured in the second model tends to increase as the gap h increases. It is shown, in the second model assuming that the gap h is constant, that the reflection coefficient R measured by using the first ultrasonic wave UW1 of the first frequency is greater than the reflection coefficient R measured by using the second ultrasonic wave UW2 of the second frequency.

That is, it is shown that the image (or second image) generated, in the low temperature/low humidity environment, by using the second ultrasonic wave UW2 of the second frequency in the frequency band lower than the first frequency has the reflection coefficient R close to that in the first model (or normal finger) in comparison with the image (or first image) generated by using the first ultrasonic wave UW1 of the first frequency.

FIG. 11 shows photos of fingerprint images taken in first and second environments, by using a second ultrasonic wave. In FIG. 11, a normal finger photo shows the finger F (see FIG. 4) in the first environment corresponding to a room temperature/room humidity environment, and a dry finger photo shows the finger F in the second environment corresponding to a low temperature/low humidity environment. In addition, the second frequency was applied in FIG. 11. Referring to FIG. 11, it is shown that the ridge RID and the valley VAL are well distinguished even in the second environment as described above.

Referring back to FIG. 1, after generating at operation S50 the image (or second image) by using the second frequency, the ultrasonic fingerprint sensor 400 compares the second image with the registered reference image (or first reference image) to make a determination (operation S40).

If it is determined at operation S40 that a matching score as a result of comparison between the second image and the registered reference image (or first reference image) is equal to or greater than the threshold value, the authentication is completed.

The ultrasonic fingerprint sensing method according to some example embodiments may be capable of successfully performing fingerprint recognition regardless of the environment in such a way of attempting, when it is difficult to recognize the fingerprint because the fingerprint is exposed to the second environment, the fingerprint recognition by using the second ultrasonic wave UW2 of the second frequency belonging to a frequency band lower than the first frequency.

Hereinafter, an ultrasonic fingerprint sensor according to some example embodiments may be described. In the following embodiments, the same components as those of the above-described embodiment are denoted by the same reference numerals, and some description thereof may be omitted or simplified.

Figure 12:
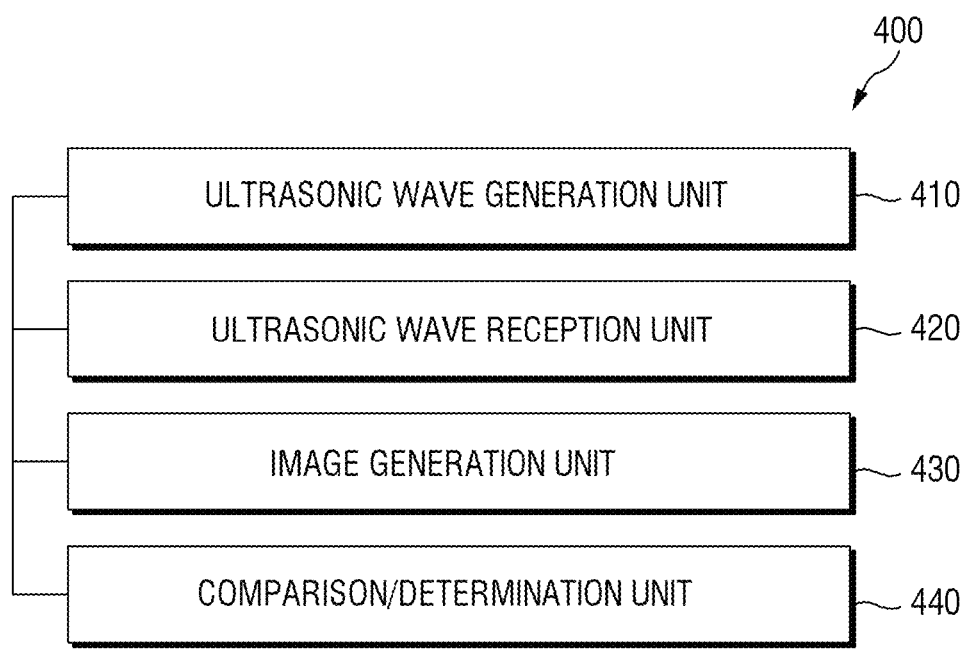
FIG. 12 is a block diagram illustrating an ultrasonic fingerprint sensor according to some example embodiments.

FIG. 12 is a block diagram illustrating an ultrasonic fingerprint sensor according to some example embodiments.

Referring to FIG. 12, the ultrasonic fingerprint sensor 400 according to some example embodiments includes an ultrasonic wave generation unit 410, an ultrasonic wave reception unit 420, an image generation unit 430, and a comparison/determination unit 440.

The ultrasonic wave generation unit 410 generates the first ultrasonic wave UW1 with the first frequency (operation S10) as described with reference to FIG. 1.

The ultrasonic wave reception unit 420 receives the first signal L1 reflected by the ridge RID and the valley VAL of the fingerprint (operation S20) as described with reference to FIG. 1.

The image generation unit 430 generates the images (first and second images) (operations S30 and S50) as described with reference to FIG. 1.

The comparison/determination unit 440 compares the images (first and second images) with the registered reference image and makes a determination (operation S40) as described with reference to FIG. 1.

The roles of the components 410, 420, 430, and 440 of the ultrasonic fingerprint sensor 400 have been described in more detail with reference to FIGS. 1 to 11, and thus a detailed description thereof will be omitted.

The ultrasonic fingerprint sensor 400 generates the first ultrasonic wave UW1 with the first frequency (operation S10).

Hereinafter, an ultrasonic fingerprint sensing method according to some example embodiments will be described. In the following embodiments, the same components as those of the above-described embodiments are denoted by the same reference numerals, and some description thereof may be omitted or simplified.

Figure 13:
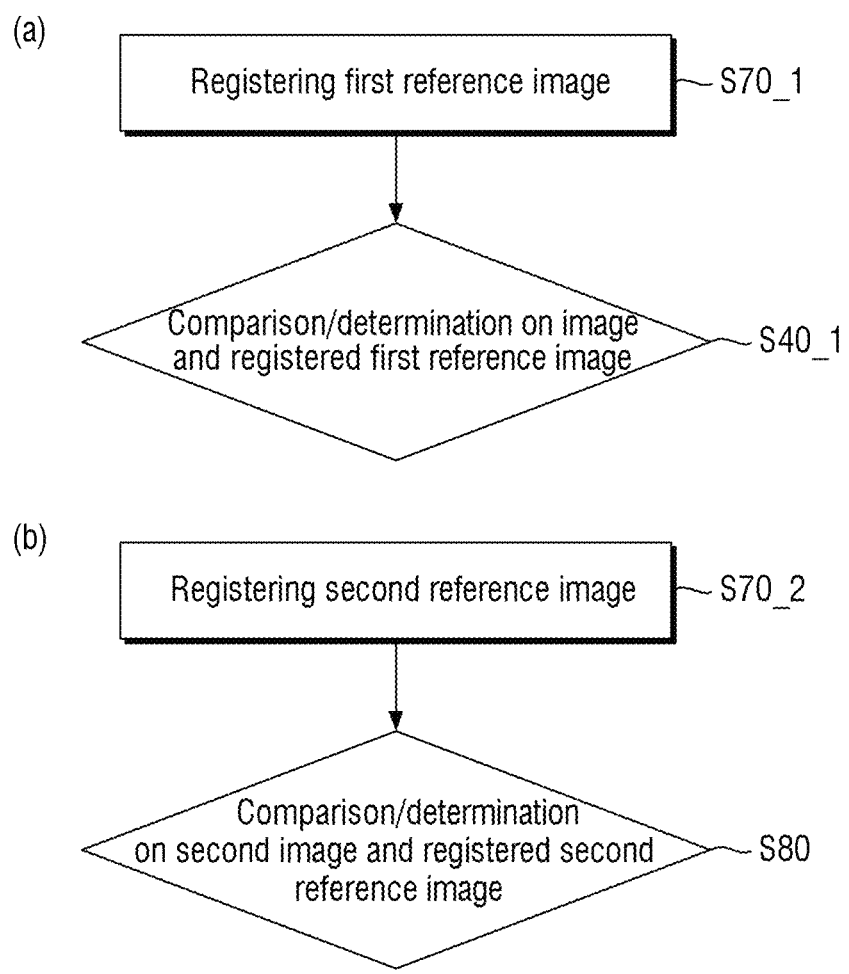
FIGS. 13 and 14 are flowcharts of an ultrasonic fingerprint sensing method according to some example embodiments.
Figure 14:
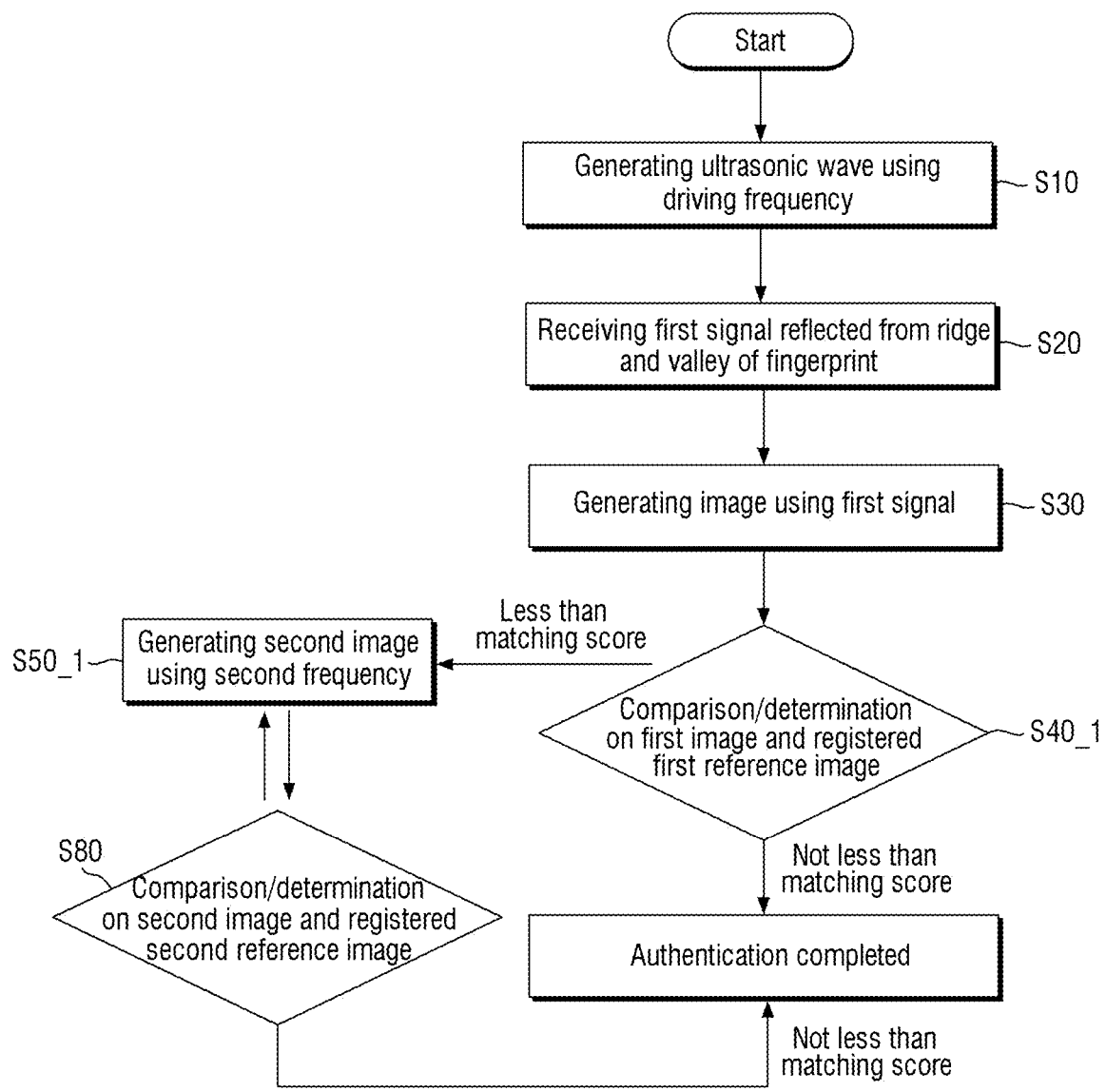

FIGS. 13 and 14 are flowcharts of an ultrasonic fingerprint sensing method according to some example embodiments. Although FIGS. 13 and 14 illustrate various operations according to some example embodiments, the number of operations and the order of operations may vary according to some example embodiments. For example, according to some example embodiments, there may be additional operations or fewer operations, or the order of the operations may vary, without departing from the spirit and scope of embodiments according to the present disclosure.

Referring to FIGS. 13 and 14, the ultrasonic fingerprint sensing method according to some example embodiments differs from the ultrasonic fingerprint sensing method according to the above embodiments in that operation S70 for registering the reference image described above with reference to FIG. 3 may be divided into operation S70_1 for registering a first reference image (or reference image) and operation S70_2 for registering a second reference image.

In more detail, the ultrasonic fingerprint sensing method according to some example embodiments includes a reference image registration operation, which may be divided into operation S70_1 for registering the first reference image and operation S70_2 for registering the second reference image. The first reference image is identical with the reference image described with reference to FIG. 3, and the second reference image is a reference image generated in the second environment, i.e., low temperature/low humidity environment.

Unlike the ultrasonic fingerprint sensing method according to the embodiments described with respect to FIG. 1, the ultrasonic fingerprint sensing method according to this embodiment is characterized by generating the second image by using the second frequency (operation S50_1), and then comparing the second image with the registered second reference image to make a determination (operation S80). That is, determination based on comparison between the first image and the registered first reference image (operation S40_1) and determination based on comparison between the second image and the registered second reference image (operation S80) may be carried out independently of each other. Next, if it is determined that a matching score between the second reference image and the second image is equal to or greater than a threshold value, the authentication is completed.

Other descriptions have been made with reference to FIGS. 1 to 11, and thus, a redundant description will be omitted.

Figure 15:
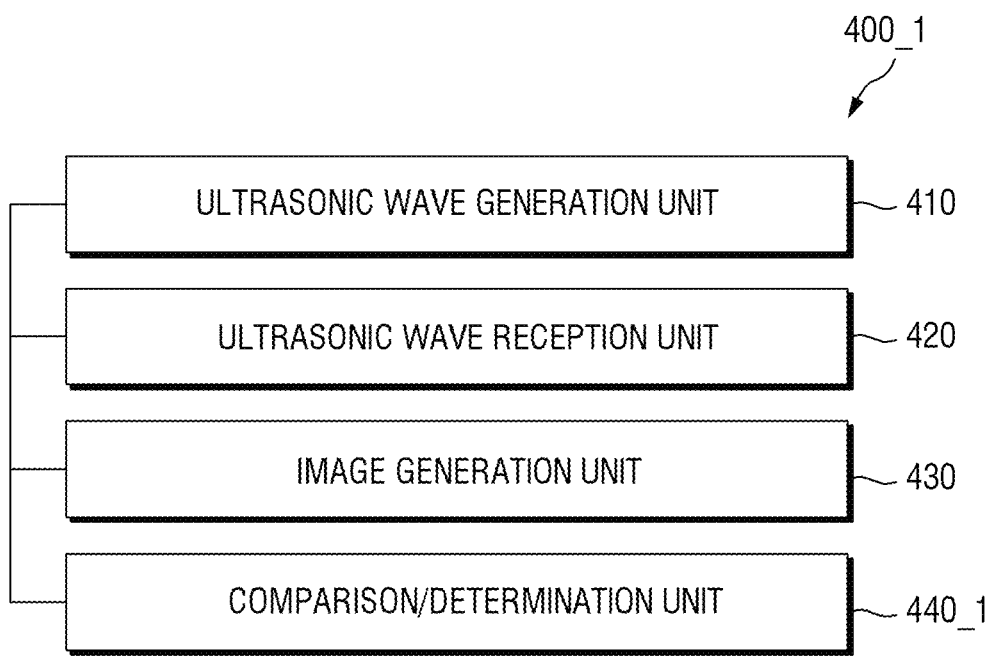
FIG. 15 is a block diagram of an ultrasonic fingerprint sensor according to some example embodiments.

FIG. 15 is a block diagram of an ultrasonic fingerprint sensor according to some example embodiments.

Referring to FIG. 15, an ultrasonic fingerprint sensor 400_1 according to the present embodiment differs from the ultrasonic fingerprint sensor 400 according to the embodiment of FIG. 12 in that a comparison/determination unit 440_1 is further responsible for comparing the second image with the registered second reference image and making a determination as described with reference to FIGS. 13 and 14.

In more detail, in the ultrasonic fingerprint sensor 400_1 according to some example embodiments, the comparison/determination unit 440_1 may be further responsible for comparing the second image with the registered second reference image and making a determination as described with reference to FIGS. 13 and 14.

Other descriptions have been made with reference to FIG. 12, and thus, a redundant description will be omitted.

Figure 16:
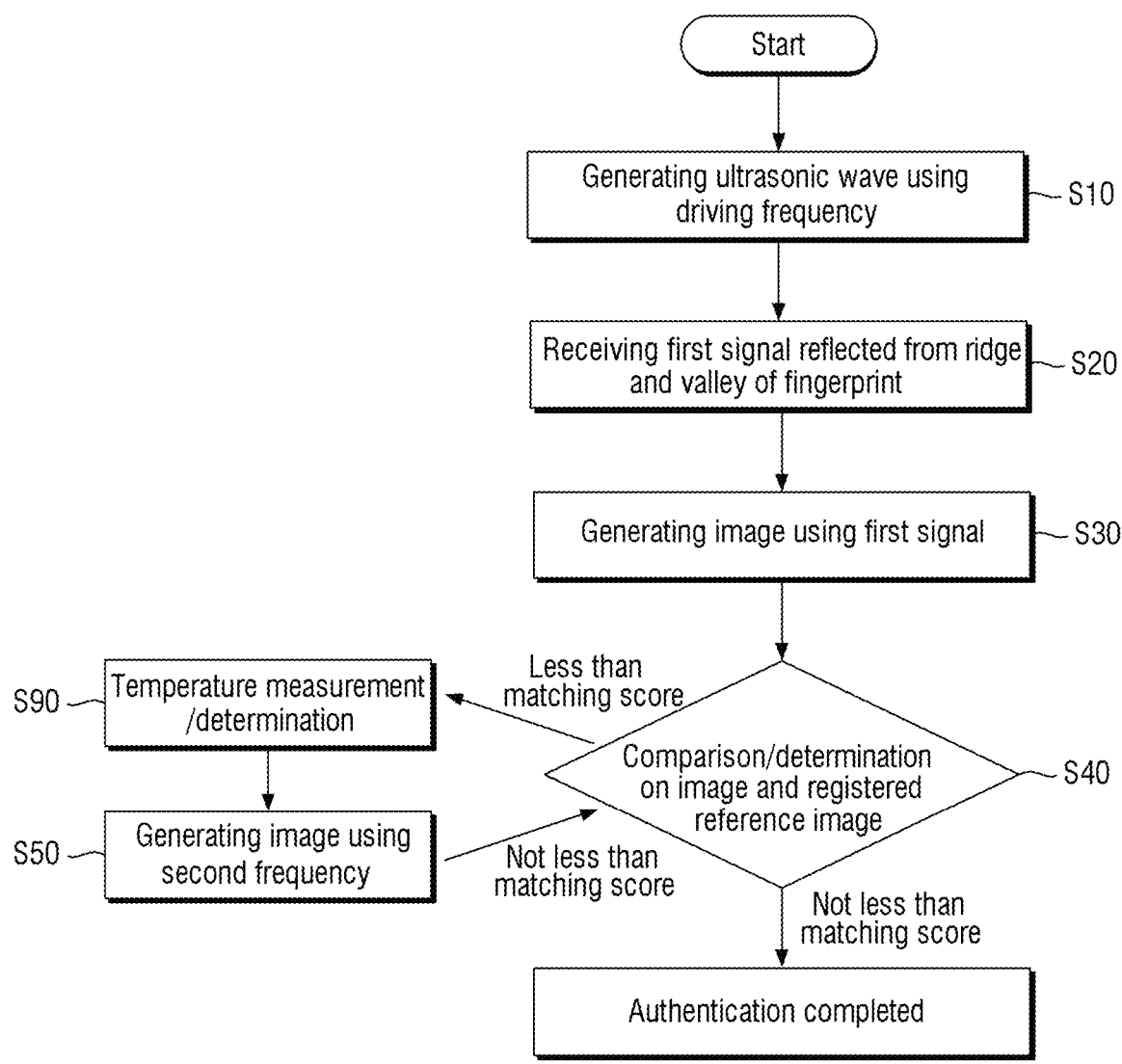
FIG. 16 is a flowchart of an ultrasonic fingerprint sensing method according to some example embodiments.

FIG. 16 is a flowchart of an ultrasonic fingerprint sensing method according to some example embodiments. Although FIG. 16 illustrates various operations according to some example embodiments, the number of operations and the order of operations may vary according to some example embodiments. For example, according to some example embodiments, there may be additional operations or fewer operations, or the order of the operations may vary, without departing from the spirit and scope of embodiments according to the present disclosure.

Referring to FIG. 16, the ultrasonic fingerprint sensing method according to some example embodiments differs from the ultrasonic fingerprint sensing method according to the above embodiments in that operation 90 for measuring a temperature and making a determination is further included.

In more detail, the ultrasonic fingerprint sensing method according to some example embodiments may further include operation S90 for temperature measurement/determination. Operation 90 for temperature measurement/determination may be performed after operation S40 for comparing the image (or first image) with the registered reference image (or first reference image) and making a determination. It may be possible to determine a temperature as an environment to which the fingerprint is exposed through operation S90 for temperature measurement/determination. If it is determined that the fingerprint is exposed to a low temperature environment through operation S90 for temperature measurement/determination, the ultrasonic fingerprint sensor 400_1 may generate an image (or second image) by using the second frequency belonging to a frequency band specified for the low temperature environment (operation S50). After generating the image (or second image) at operation S50, the ultrasonic fingerprint sensor 400_1 compares the second image with the registered reference image (or first reference image) and, if the matching score is equal to or greater than a threshold value, completes the authentication. For example, if it is determined that the temperature measured at operation S90 for temperature measurement/determination is within or below a first threshold range (e.g., in a low temperature state lower than room temperature), the ultrasonic fingerprint sensor 400_1 may use the second frequency belonging to a frequency band lower than the first frequency.

Figure 17:
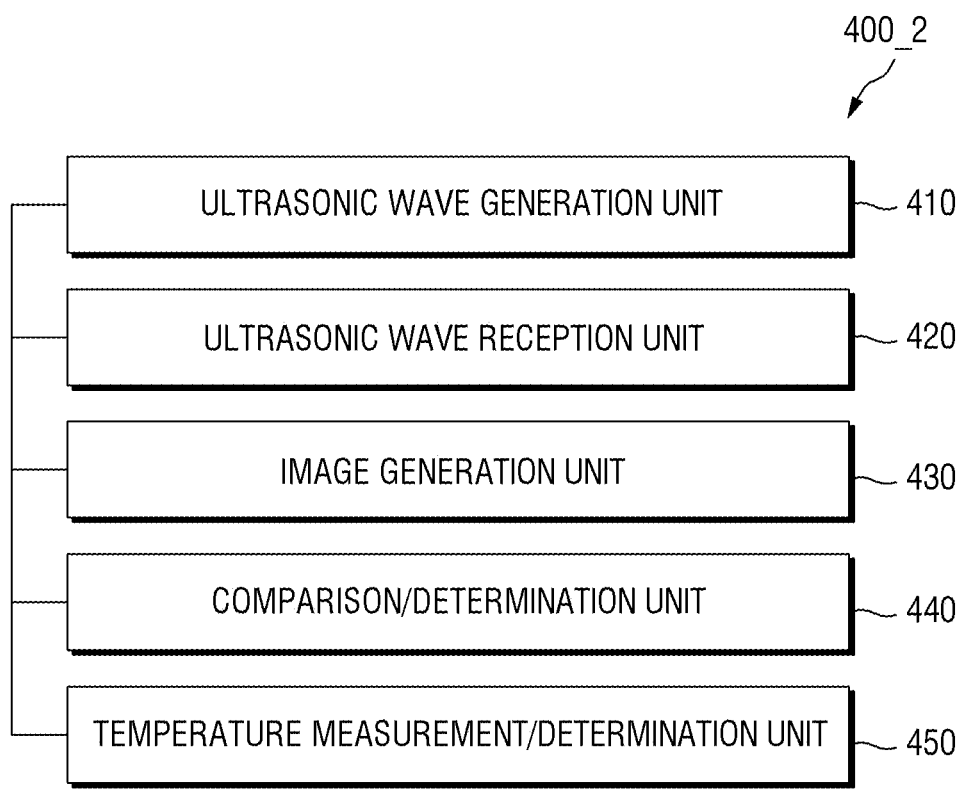
FIG. 17 is a block diagram of an ultrasonic fingerprint sensor according to some example embodiments.

FIG. 17 is a block diagram of an ultrasonic fingerprint sensor according to some example embodiments.

Referring to FIG. 17, an ultrasonic fingerprint sensor 400_2 according to some example embodiments may include a temperature measurement/determination unit 450.

In more detail, the ultrasonic fingerprint sensor 400_2 according to some example embodiments may further include the temperature measurement/determination unit 450.

The temperature measurement/determination unit 450 serves to perform the operation of operation S90 for temperature measurement/determination as described with reference to FIG. 16. Operation S90 for temperature measurement/determination and the components 410, 420, 430, and 440 have been described above and the detailed descriptions thereof will be omitted to avoid redundancy.

Figure 18:
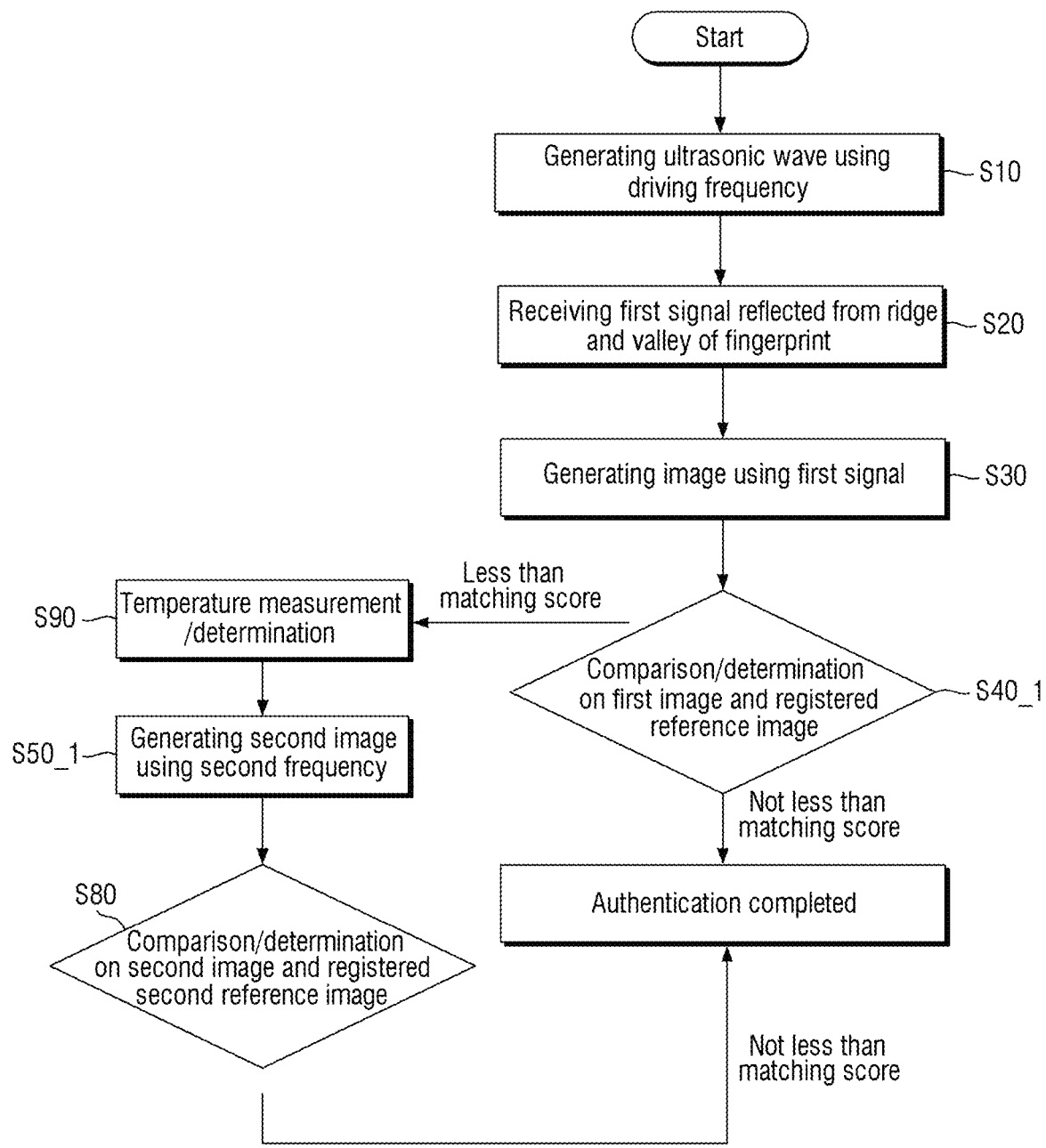
FIG. 18 is a flowchart of an ultrasonic fingerprint sensing method according to some example embodiments.

FIG. 18 is a flowchart of an ultrasonic fingerprint sensing method according to some example embodiments. Although FIG. 18 illustrates various operations according to some example embodiments, the number of operations and the order of operations may vary according to some example embodiments. For example, according to some example embodiments, there may be additional operations or fewer operations, or the order of the operations may vary, without departing from the spirit and scope of embodiments according to the present disclosure.

Referring to FIG. 18, the ultrasonic fingerprint sensing method according to some example embodiments differs from the ultrasonic fingerprint sensing method according to the embodiment of FIG. 14 in that operation S90 for temperature measurement/determination is performed between operation S40_1 for determination based on comparison between the first image and the registered first reference image and operation S50_1 for generating the second image by using the second frequency.

In more detail, the ultrasonic fingerprint sensing method according to some example embodiments may include operation S90 for temperature measurement/determination that is performed between operation S40_1 for comparing the first image with the registered first reference image to make a determination and operation S50_1 for generating the second image by using the second frequency.

Operation S90 for temperature measurement/determination has been described in more detail with reference to FIG. 16, and thus a detailed description thereof is omitted to avoid redundancy.

Figure 19:
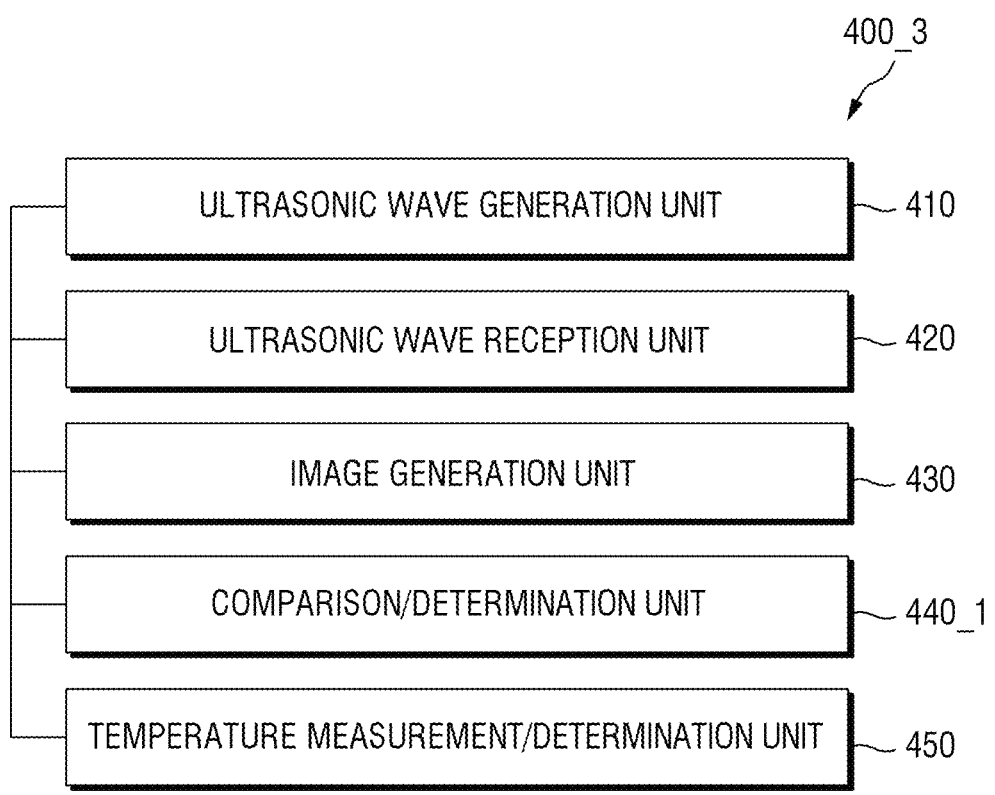
FIG. 19 is a block diagram of an ultrasonic fingerprint sensor according to some example embodiments.

FIG. 19 is a block diagram of an ultrasonic fingerprint sensor according to some example embodiments.

Referring to FIG. 19, an ultrasonic fingerprint sensor 400_3 according to some example embodiments may include a temperature measurement/determination unit 450.

In more detail, the ultrasonic fingerprint sensor 400_3 according to some example embodiments may further include the temperature measurement/determination unit 450.

The temperature measurement/determination unit 450 has been described in more detail with reference to FIG. 17, and thus some detailed description thereof may be omitted to avoid redundancy.

Although aspects of some example embodiments of the invention have been described for illustrative purposes, those skilled in the art will appreciate that various modifications, additions and substitutions are possible, without departing from the scope and spirit of the invention as disclosed in the accompanying claims and their equivalents.

What is claimed is:

1. An ultrasonic fingerprint sensing method comprising:
generating a first ultrasonic wave using a first frequency;
receiving a first signal generated by reflection of the first ultrasonic wave from each of a ridge and a valley of a fingerprint;
generating a first image based on the first signal;
comparing the first image with a registered reference image to generate a matching score; and
in response to the matching score being less than a threshold value, generating a second image using a second frequency.

2. The ultrasonic fingerprint sensing method of claim 1, wherein the second frequency belongs to a frequency band lower than the first frequency.

3. The ultrasonic fingerprint sensing method of claim 2, further comprising, after generating the second image, comparing the second image and the registered reference image.

4. The ultrasonic fingerprint sensing method of claim 3, wherein the generating of the second image using the second frequency comprises:
generating a second ultrasonic wave using the second frequency; and
receiving a second signal generated by reflection of the second ultrasonic wave from each of a ridge and a valley of the fingerprint.

5. The ultrasonic fingerprint sensing method of claim 4, wherein a ratio of strength of the second signal to strength of the second ultrasonic wave is smaller than a ratio of strength of the first signal to strength of the first ultrasonic wave.

6. The ultrasonic fingerprint sensing method of claim 4, wherein comparing the first image and the registered reference image comprises registering a first reference image, comparing the second image and the registered reference image comprises registering a second reference image, the first reference image is generated based on the first signal, the second reference image is generated based on the second signal, and comparing the second image and the registered reference image comprises comparing the second image and the second reference image.

7. The ultrasonic fingerprint sensing method of claim 1, wherein the generated ultrasonic wave is configured to pass through multiple layers to reach the fingerprint, and the multiple layers include a display panel and a cover window.

8. An ultrasonic fingerprint sensing method comprising:
generating a first ultrasonic wave using a first frequency;
receiving a first signal generated by reflection of the first ultrasonic wave from each of a ridge and a valley of a fingerprint;
generating a first image based on the first signal;
comparing the first image and a registered reference image to generate a matching score; and
in response to the matching score being less than a threshold value, measuring a temperature of the fingerprint.

9. The ultrasonic fingerprint sensing method of claim 8, further comprising, after measuring the temperature of the fingerprint, generating a second image using a second frequency based on the temperature of the fingerprint.

10. The ultrasonic fingerprint sensing method of claim 9, further comprising, after generating the second image, comparing the second image and the registered reference image.

11. The ultrasonic fingerprint sensing method of claim 10, wherein the generating of the second image using the second frequency comprises:

generating a second ultrasonic wave using the second frequency; and receiving a second signal generated by reflection of the second ultrasonic wave from each of a ridge and a valley of the fingerprint.

12. The ultrasonic fingerprint sensing method of claim 11, wherein comparing the first image and the registered reference image comprises registering a first reference image, comparing the second image and the registered reference image comprises registering a second reference image, the first reference image is generated based on the first signal, the second reference image is generated based on the second signal, and comparing the second image and the registered reference image comprises comparing the second image and the second reference image.

13. The ultrasonic fingerprint sensing method of claim 12, wherein if the temperature of the fingerprint is within or below a first threshold range, the second frequency belongs to a frequency band lower than the first frequency.

14. An ultrasonic fingerprint sensor comprising:
an ultrasonic wave generator configured to generate a first ultrasonic wave using a first frequency;
a reception unit configured to receive a first signal generated by reflection of the first ultrasonic wave from each of a ridge and a valley of a fingerprint;
an image generator configured to generate a first image based on the first signal; and
a comparison/determination unit configured to perform comparison/determination on the first image and a registered reference image; and wherein the image generator is configured to generate a second image using a second frequency in response to a determination by the comparison/determination unit that a matching score as a result of comparison between the first image and the registered reference image is less than a threshold value.

15. The ultrasonic fingerprint sensor of claim 14, wherein the second frequency belongs to a frequency band lower than the first frequency.

16. The ultrasonic fingerprint sensor of claim 15, wherein the comparison/determination unit is further configured to perform comparison/determination on the second image and the registered reference image.

17. The ultrasonic fingerprint sensor of claim 16, wherein the comparison/determination unit is configured to register a first reference image and a second reference image different from the first reference image, and wherein the first reference image is generated based on the first signal, and the second reference image is generated based on a second signal different from the first signal.

18. The ultrasonic fingerprint sensor of claim 17, wherein the comparison/determination unit is configured to perform comparison/determination on the second image and the registered second reference image.

19. An ultrasonic fingerprint sensor comprising:
an ultrasonic wave generator configured to generate a first ultrasonic wave using a first frequency;
a reception unit configured to receive a first signal generated by reflection of the first ultrasonic wave from each of a ridge and a valley of a fingerprint;
an image generator configured to generate a first image based on the first signal; and
a comparison/determination unit configured to perform comparison/determination on the first image and a registered reference image;
a temperature measurement/determination unit configured to perform measurement/determination on a temperature of the fingerprint,
wherein the temperature measurement/determination unit is configured to perform measurement/determination on the temperature of the fingerprint in response to a determination by the comparison/determination unit that a matching score as a result of comparison between the first image and the registered reference image is less than a threshold value.

20. The ultrasonic fingerprint sensor of claim 19, wherein the image generator is configured to generate a second image using a second frequency based on the temperature of the fingerprint.

21. The ultrasonic fingerprint sensor of claim 20, wherein the comparison/determination unit is further configured to perform comparison/determination on the second image and the registered reference image.

22. The ultrasonic fingerprint sensor of claim 21, wherein the comparison/determination unit is configured to register a first reference image and a second reference image different from the first reference image, the first reference image is generated based on the first signal, the second reference image is generated based on a second signal different from the first signal, and the comparison/determination unit is configured to perform comparison/determination on the second image and the second reference image.

23. The ultrasonic fingerprint sensor of claim 22, wherein in response to the temperature of the fingerprint being within or below a first threshold range, the second frequency belongs to a frequency band lower than the first frequency.

* * * * *